United States Patent
Wada

[19]
[11] Patent Number: 6,069,765
[45] Date of Patent: May 30, 2000

[54] TAPE CARTRIDGE SETTING MECHANISM WITH PLURAL SPACED APART GUIDE ROLLERS FOR THE CARTRIDGE TRAY

[75] Inventor: Satoshi Wada, Yamagata, Japan

[73] Assignee: NEC Corporation, Tokyo, Japan

[21] Appl. No.: 08/974,500

[22] Filed: Nov. 19, 1997

[30] Foreign Application Priority Data

Dec. 17, 1996 [JP] Japan ................. 8-337053

[51] Int. Cl.[7] ............................... G11B 5/008
[52] U.S. Cl. ............................................. 360/96.5
[58] Field of Search ................. 360/96.5; 242/338.4, 242/339

[56] References Cited

U.S. PATENT DOCUMENTS

| | | | |
|---|---|---|---|
| 5,018,031 | 5/1991 | Wada | 360/96.5 |
| 5,038,237 | 8/1991 | Kim | 360/96.5 |
| 5,394,282 | 2/1995 | Wada | 360/96.5 |

FOREIGN PATENT DOCUMENTS

| | | |
|---|---|---|
| 62-226465 | 10/1987 | Japan . |
| 6-162635 | 6/1994 | Japan . |

*Primary Examiner*—David D. Davis
*Attorney, Agent, or Firm*—Young & Thompson

[57] ABSTRACT

Two guide rollers are provided on the same side of a cartridge tray. The guide rollers are moved in respective guide groves for guiding the upward/downward movement of the cartridge tray. The guide grooves are spaced apart vertically and horizontally to assure properly aligned movement of the cartridge tray.

2 Claims, 6 Drawing Sheets

TAPE CARTRIDGE SETTING MECHANISM WITH PLURAL SPACED APART GUIDE ROLLERS FOR THE CARTRIDGE TRAY

BACKGROUND OF THE INVENTION

1. Field of the Invention

The present invention relates to a mechanism for setting a cartridge having a tape reel housed therein, more particularly to a mechanism for setting a magnetic tape cartridge in a magnetic tape device.

2. Description of the Related Art

Figure 1:
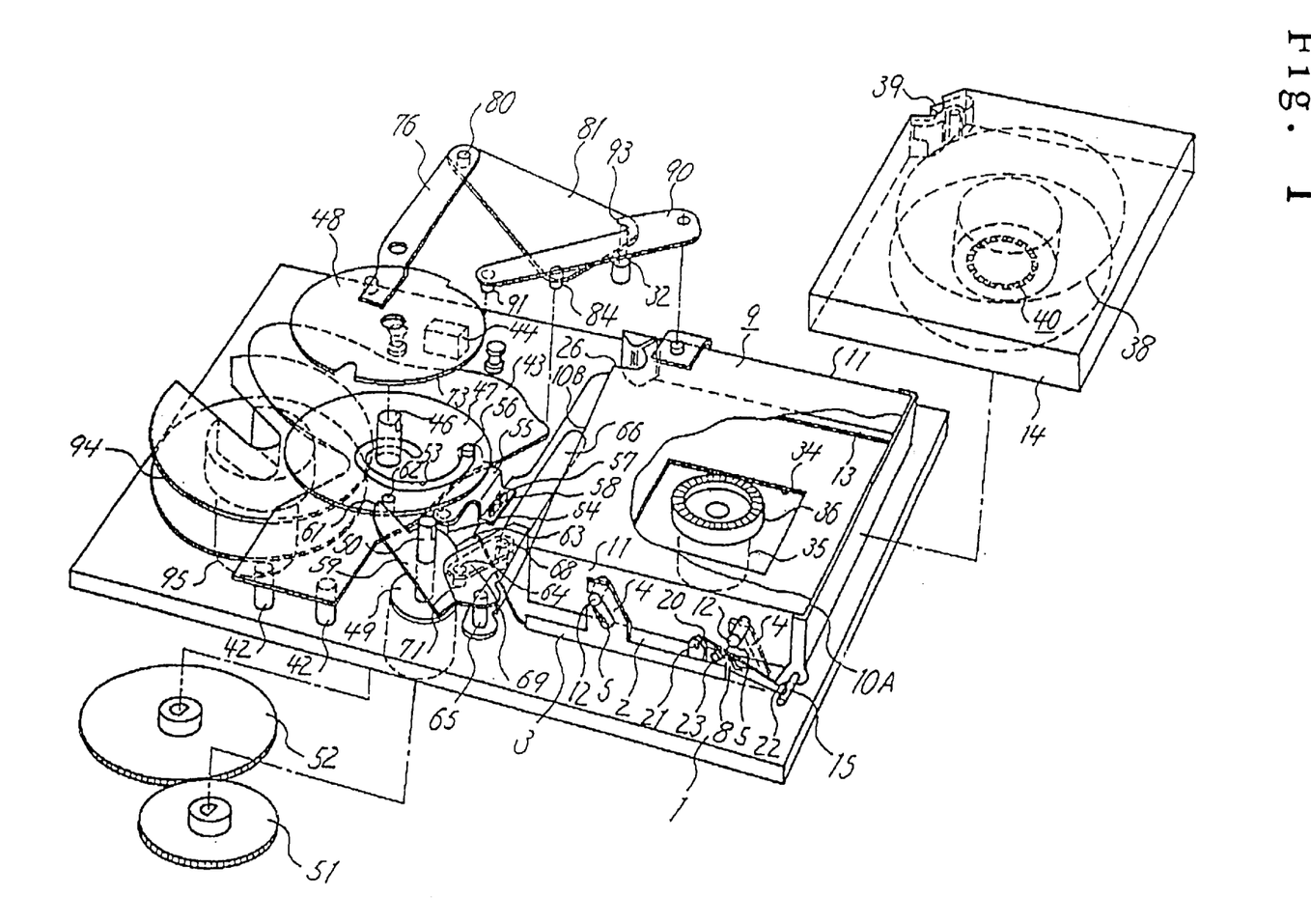
FIG. 1 is an exploded view in perspective of a cartridge setting mechanism according to the conventional technique.

FIG. 1 is an exploded view in perspective of a magnetic tape cartridge setting mechanism of a conventional type described in Japanese Patent Laid-open 226465/1987.

Figure 2:
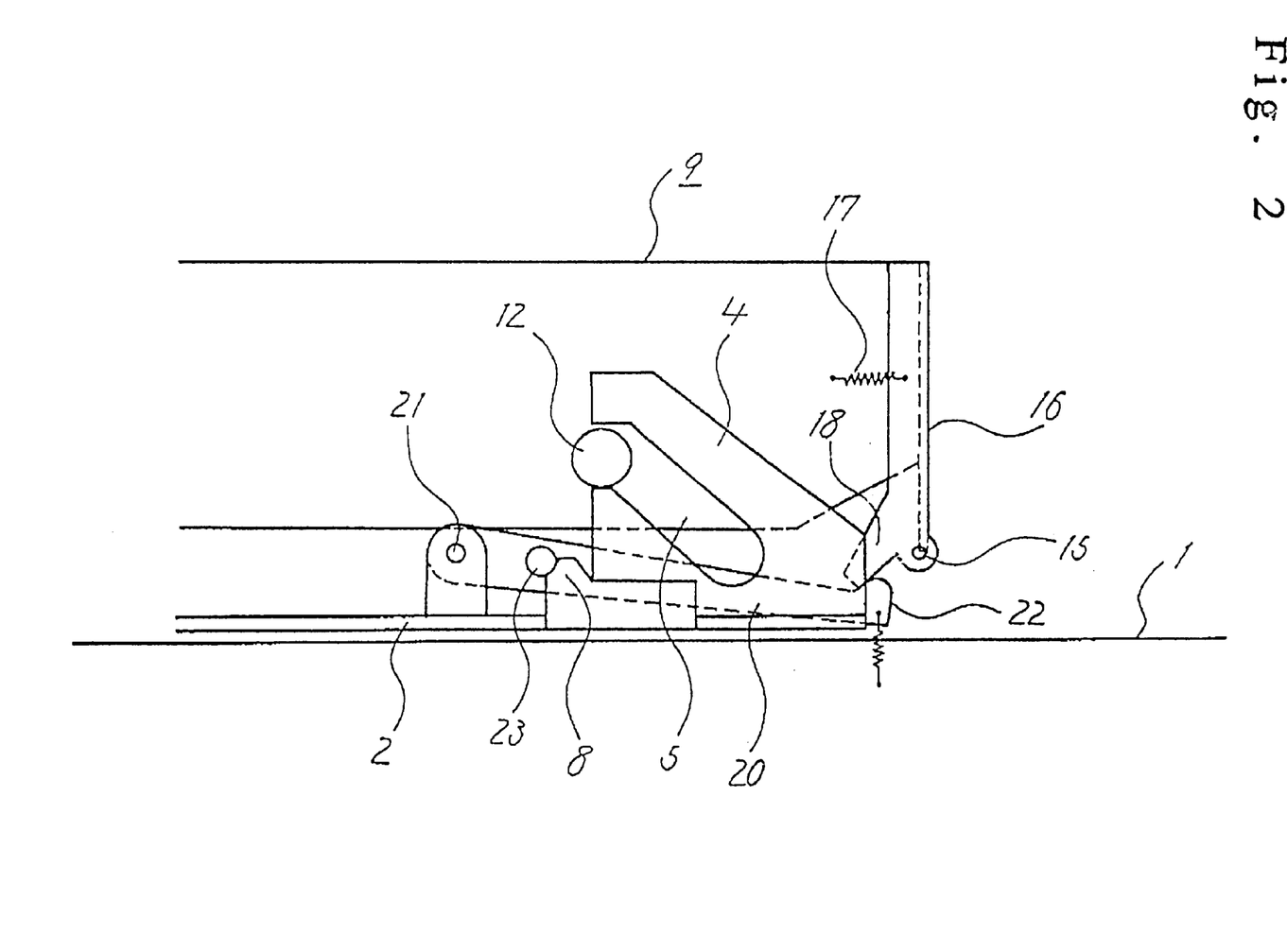
FIG. 2 is a partial side view illustrating guide plate 4 and surroundings thereof shown in FIG. 1.

In FIG. 1, housing driving plate 2 is provided on base plate 1 in a slidable manner, having linear standing plates 3, 3 (only standing plate 3 in one side is shown) of a long and narrow shape parallelly provided on both sides thereof. A pair of guide plates 4, 4 of the same shape are vertically provided on standing plates 3, 3, respectively, being horizontally spaced to each other. Both guide plates 4, 4 have guide grooves 5, 5 of the same shape formed in the same direction, respectively. FIG. 2 is a side elevation showing one guide plate 4 and its surroundings, where each guide groove 5 is composed of a horizontal part at the top thereof and inclined surfaces extending obliquely downwardly.

Above housing driving plate 2, there is provided housing 9 of a flat and approximately square shape with a downwardly open almost U-shaped section disposed in such a manner that openings 10 A and 10 B in respective ends thereof are situated in the longitudinal direction of said base plate 1. On each of both side walls 11, 11 of this housing 9, a pair of pins 12, 12 (only pins 12, 12 on one side wall 11 are shown) are provided being projected therefrom and horizontally spaced to each other, where the distance between both pins 12, 12 is equal to the distance between both guide plates 4, 4 provided on one standing plate 3. Pin 12 is supported by guide groove 5 and housing 9 is guided so that it can be moved in the vertical direction by means of a guide member which is not shown here.

Support plate 13 is provided inside each side wall 11 of housing 9 in the horizontal direction at the lower end thereof. Housing 9 has a shape almost similar with the shape of tape cartridge 14, and hence by preparing housing 9 such that both ends of tape cartridge 14 are supported on both support plates 13, 13, housing 9 can contain and hold tape cartridge 14.

In opening 34 formed in the central part of housing driving plate 2, there is face gear (end surface gear in a form of a crown gear) 36 to be driven by motor 35 which is vertically provided on base plate 1. Opening 34 is formed being sufficiently spaced from face gear 36 so that face gear 36 may not hinder movement of housing driving plate 2.

In tape reel 38 provided inside tape cartridge 14 which is to be inserted into housing 9 from opening 10 A, there is attached face gear 40 with gear teeth formed downwards. Face gear 40 engages with face gear 36 thereby transmitting the drive of motor 35 to tape reel 38.

On base plate 1, stationary cam 43 of a plate form is provided in such a manner that it is supported by a plurality of props 42, 42 . . . , rotation shaft 46 is provided on said stationary cam 43 in the rotatable relationship, and a first disk 47 and a second disk 48 are fitted to rotation shaft 46 so that they can slide accompanying the rotation of rotation shaft 46, respectively. Motor 49 vertically provided on base plate 1 rotates rotation shaft 46 through spur gears 51, 52 attached to rotation shaft 50 of motor 49.

Figure 3:
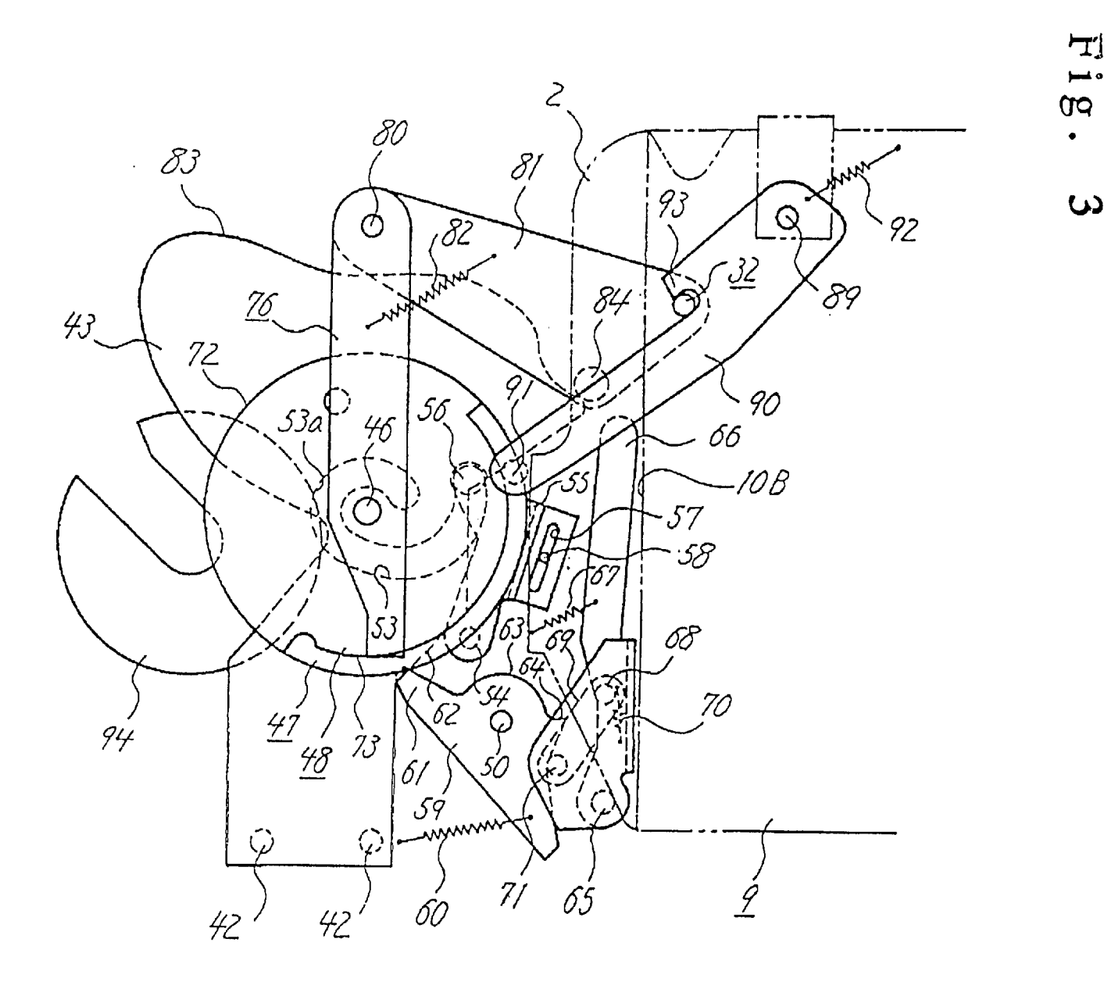
FIG. 3 is a partial plan view illustrating first and second disks 47, 48 and surroundings thereof shown in FIG. 1.

FIG. 3 is a plan view showing disks 47, 48 and surroundings thereof.

Cam groove 53 of almost a spiral shape is formed in first disk 47.

Lever 55 is provided in such a manner that it is rotatably movable around support shaft 54 vertically provided on base plate 1 and substantially along the direction of movement of housing driving plate 2. Pin 56 projectingly provided at the tip of lever 55 engages with cam groove 53 of first disk 47 and pin 58 projectingly provided on the end of housing driving plate 2 engages with long hole 57 formed in lever 55. First ejection middle lever 59 is set on rotation shaft 50 so as to be rotatable independent of the movement of rotation shaft 50, and arm 61 of lever 59 extending toward first disk 47 pressure contacts with pin 62 projectingly provided on first disk 47 being influenced by the effect of spring 60. Ejection lever 66 is provided in a rotatable manner centering support 65 which is vertically provided on base plate 1, with the tip of eject lever 66 which enters housing 9 through opening 10 B of housing 9. Pin 71 provided at the tip of second ejection middle lever 69 set on support 68 provided on ejection lever 66 pressure contacts with first ejection middle lever 59 through the effect of spring 70.

FIG. 3 shows an initial state in which tape cartridge 14 is not yet inserted into housing 9. In this state, pin 56 of lever 55 is located in the outermost circumference side of cam groove 53 formed in first disk 47. First ejection middle lever 59 is pushed by pin 62 of first disk 47 to turn counterclockwise, pin 71 of second ejection middle lever 69 abuts on the rear of stepped part 64 of first ejection middle lever 59, and ejection lever 66 shunts out of housing 9 due to the function of spring 67.

In these circumstances, in order to record/read information on or from a tape of tape cartridge 14 with this magnetic tape device, it is required to first push a start button not shown. Then, motor 49 is driven to turn rotation shaft 46 counterclockwise, concurrently causing first disk 47 united with rotation shaft 46 to turn also counterclockwise. With the rotation of this first disk 47, first ejection middle lever 59 which is in contact with pin 62 is rotated clockwise under the influence of spring 60 and concurrently pin 56 of lever 55 which is in engagement with cam groove 53 moves toward the center of first disk 47 thereby turning lever 55 counterclockwise to make housing driving plate 2 move in the left direction in FIG. 1. In the initial state of this housing driving plate 2, as shown in FIG. 2, each pin 12 of housing 9 fitted in guide groove 5 of each guide plate 4 is located at the outer end of a horizontal part in the upper end of guide groove 5. When this housing driving plate 2 moves in the left direction in FIG. 2, door 16 (being energized toward the closing direction of spring 17) provided at opening 10 A of housing 9 is turned around support 15 (which is fixed to housing 9) to open by the function of lever 20 which has pin 23 attached to support shaft 21 provided on base plate 1 and cam 8 provided on housing driving plate 2.

With door 16 held open, tape cartridge 14 is inserted into housing 9 through opening 10 A. When the insertion of tape cartridge 14 is detected by such as a limit switch, motor 49 is driven again to turn first disk 47 anticlockwise, and accordingly pin 56 moves along cam groove 53 further toward the center direction of first disk 47 thereby turning lever 55 counterclockwise and making housing driving plate 2 shift in the left direction. Consequently, each pin 12 goes down along the inclined surface of each guide groove 5, thereby causing housing 9 to go down and resultantly making face gear 40 of tape cartridge 14 engage with face gear 36.

Also, accompanying the rotation of second disk 48 which is generated being driven by motor 49, leader block 39 attached to the initial tape at the top of tape cartridge 14 is drawn out of tape cartridge 14 and drawn around so that the tape contacts magnetic head 44 on base plate 1 and then attached to winding reel 94 which is to be driven by motor 95 vertically provided on base plate 1, owing to the operation of the following items such as first driving arm 76 fitted to rotation shaft 46, second driving arm 81 set on support 80 provided on first driving arm 76 while having pin 84 which moves along the cam surface of stationary cam 43, driving lever 90 which is fitted to hold pin 32 provided on second driving arm 81 and on support 89 which is stationary with reference to base plate 1 while having pin 91 which contacts the cam surface 73 of second disk 48.

After finishing recording/reading of the tape using magnetic head 44 and winding the tape again by tape reel 38, motor 49 is driven to turn first disk 47 clockwise. Accordingly, pin 56 begins to move cam groove 53 of first disk 47, lever 55 turns clockwise causing housing driving plate 2 to move in the right direction in FIG. 1, each pin 12 goes upward along the inclined part of each guide groove 5 and housing 9 also ascends to release engagement between face gears 40 and 36. When each pin 12 reaches the uppermost end of guide groove 5, ascending of housing 9 is stopped and then door 16 is opened by the operation of lever 20. pin 23 and cam 8.

While, when housing 9 reaches the uppermost ascended position, first ejection middle lever 59 is pushed by pin 62 projectingly provided on first disk 47 and turns counterclockwise. Then, since pin 71 of second ejection middle lever 69 is engaged with stepped part 64 of first ejection middle lever 59, this second ejection middle lever 69 is moved in the substantially longitudinal direction because of the anticlockwise turn of first ejection middle lever 59, and ejection lever 66 is turned clockwise against the force of spring 67, and hence tape cartridge 14 in housing 9 is pushed by ejection lever 66 to be pushed out through opening 10 A which is held open.

In the conventional technique described above, the setting speed and the discharging speed of cartridges are dispersed in a wide range without converging to some fixed value, thus having a problem that the setting and the discharging motion of cartridges remain unstable. For example, in some case, a cartridge is suddenly discharged and hence it is difficult to push out only the front edge of the cartridge from the housing (cartridge tray) but the whole cartridge is rushed out causing the cartridge to drop down straight, or in another case, the cartridge discharge operation is not finished within an allowable limit of time judged from the viewpoint of design.

The reason of the above is that the conventional technique has a complicated structure in which many cams, links and springs are used, in other words, because of the dispersion in dimensions of various parts, the dispersion of various spring force and the influence of various friction, the operation speed of ejection lever for discharging cartridges or the upward and downward motion speed of the housing vary in a wide range.

SUMMARY OF THE INVENTION

An object of the cartridge setting mechanism of the present invention is to provide a cartridge of a simple structure by reducing the number of cams and links to be used and eliminating springs to be used for decreasing the dispersion of cartridge setting speed and discharging speed, thereby increasing the motion reliability of the cartridge setting mechanism of the present invention.

A first effect of the present invention is that it can provide a stable discharging speed of the cartridge thereby securing a discharging operation that is certain.

The reason for the above is that the influence of the dimensional dispersion of or friction between various parts is reduced by using the minimum number of cams and links reguired without using any springs. Consequently, it is possible to discharge the cartridge at a speed suitable for ejecting only the front of the cartridge from a cartridge tray without dropping the cartridge by discharging it abruptly.

A second effect of the present invention is that the cartridge setting speed is maintained stable thereby assuring the normal cartridge setting operation.

The reason for the above is that upward and downward movement of the cartridge tray is performed using a minimum number of cams and links without using any springs, and the downward movement of the cartridge tray can be performed in a stable manner after the cartridge is set to position.

The tape cartridge setting mechanism of the present invention comprises: a cartridge tray (106 in FIG. 4) which allows a cartridge with a tape reel to be set therein (105 in FIG. 4) and allows the cartridge to be put in and taken out from the front; guide roller (107a in FIG. 4) provided on the side of the cartridge tray; a guide portion for leading the cartridge tray for the vertical movement; and a load cam (102 in FIG. 4) having a cam groove (102a in FIG. 6) on the outer circumference thereof and serves for moving said cartridge tray vertically by moving said guide roller by turning around a stationary shaft; and more preferably, the tape cartridge setting mechanism of the present invention further comprises: a load gear (103a in FIG. 4) which turns corresponding to the turn of said load cam; a load gear pin (115 in FIG. 4) eccentrically provided on this load gear; and an ejection arm (111 in FIG. 4) pivotally fitted to a stationary shaft (114 in FIG. 4) for discharging the cartridge from the front of said cartridge tray, and said ejection arm having an edge portion (111b in FIG. 4) and a cartridge push roller (111a in FIG. 4), said edge portion being pushed by said load gear pin to turn the ejection arm thereby causing said cartridge push roller to push the cartridge which is set in said cartridge tray, while said cartridge tray is held stopped at an elevated position by said load cam. It is also preferable that said load cam has a cam groove which runs horizontally from the ejection position to the demounted position and obliquely goes down from the demounted position to the mounted position.

Further, the above tape cartridge setting mechanism preferably comprises: a driving arm (110a in FIG. 4) for moving said cartridge tray upward and downward by an up and down fluctuating movement corresponding to the rotation of said load cam, the driving arm being supported at one end thereof by a right and left directional shaft (112 in FIG. 4) while having, on the other end, a cam follower (109 in FIG. 4) which travels along said cam groove, and having a driving groove (110c in FIG. 5) provided in a lateral or an obliquely lateral direction for guiding said guide roller along the driving groove; wherein further, said cartridge tray has a first guide roller (107a in FIG. 4) on one side, and has a second guide roller (107b in FIG. 4) provided on both sides of the tray or on either one of the sides, wherever the attached height of the second guide roller is different from that of the first guide roller, and has a third guide roller (107*c* in FIG. 4) provided on the other side at the same height as that of said first guide roller; said driving arm is fixed at one end thereof to a timing shaft (112 in FIG. 4) which is provided rotatably but unmovable in the right and left directions, said driving arm having on the other end thereof the cam follower which travels along said cam groove, and a first driving groove (110*c* in FIG. 5) provided in a lateral or an obliquely lateral direction for guiding said first guide roller; said guiding portion having a first guide plate (108*a* in FIG. 4) having a vertical first guide groove (113*a* in FIG. 5) for guiding along the groove said first guide roller provided on one side of said cartridge, a second guide plate (108*b* in FIG. 4) having a vertical third guide groove for guiding along the groove said third guide roller provided on the other side of said cartridge, and a second guide groove for guiding along the groove said second guide roller provided on said first and second guide plates or either one of them; and a driven arm (110*b* in FIG. 4) being fixed to said timing shaft at one end thereof, having a second driving groove parallel to said first driving groove for guiding said third guide roller along said second driving groove.

The tape cartridge setting mechanism of the present invention comprises a cartridge tray (106 in FIG. 4) which allows cartridge (105 in FIG. 4) with a tape reel to be set therein, wherein said cartridge can be taken out and put in the front of said cartridge tray, a load gear (103*a* in FIG. 4) which turns around a stationary shaft, a load gear pin (115 in FIG. 4) eccentrically provided on this load gear, and an ejection arm (111 in FIG. 4) pivotally fitted to a stationary shaft (114 in FIG. 4) which includes a cartridge push roller (111*a* in FIG. 4) for pushing and discharging the cartridge set in the cartridge tray from the front of said cartridge tray, the ejection arm having an edge portion (111*b* in FIG. 4) which is pushed by the load gear pin to turn thereby causing the cartridge push roller (111*a* in FIG. 4) to push the cartridge which is set in the cartridge tray for discharging.

Here, it is to be noted that a phrase "vertical direction" or "lateral direction" used in claims or in the means for solving problems does not mean a vertical direction or a lateral direction in the narrow meaning but merely expresses one direction and a direction perpendicular to that direction. In the same way, the phrase "upward and downward movement" used in the above is not limited to a vertical movement in a narrow meaning, and merely expresses movement along one direction as described above.

As for a guide roller, a cam follower and a cartridge push roller, these are not limited to items in the form of a roller, which can rotate or turn but may include items of pin form which can not rotate or turn.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Next, the present invention will be described with reference to the drawings.

Figure 4:
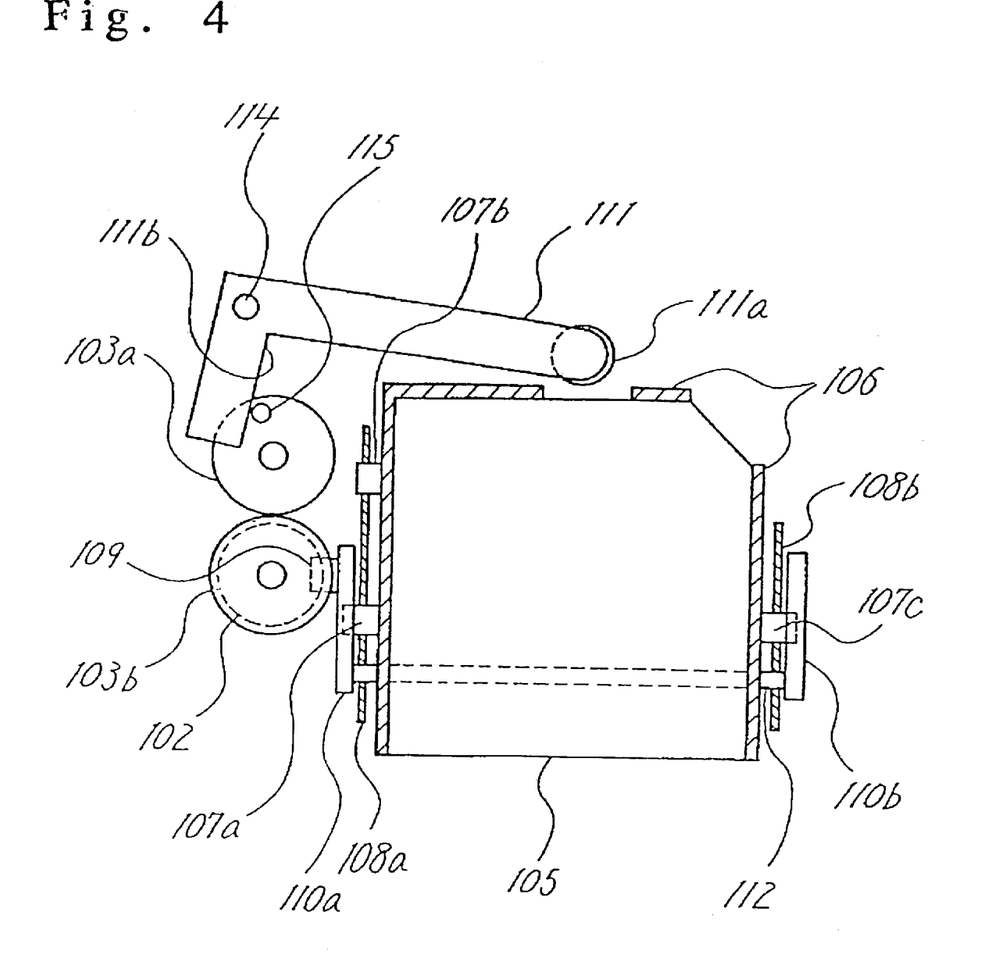
FIG. 4 is a plan view, partially in cross section, of an embodiment of a tape cartridge setting mechanism of the present invention.
Figure 5:
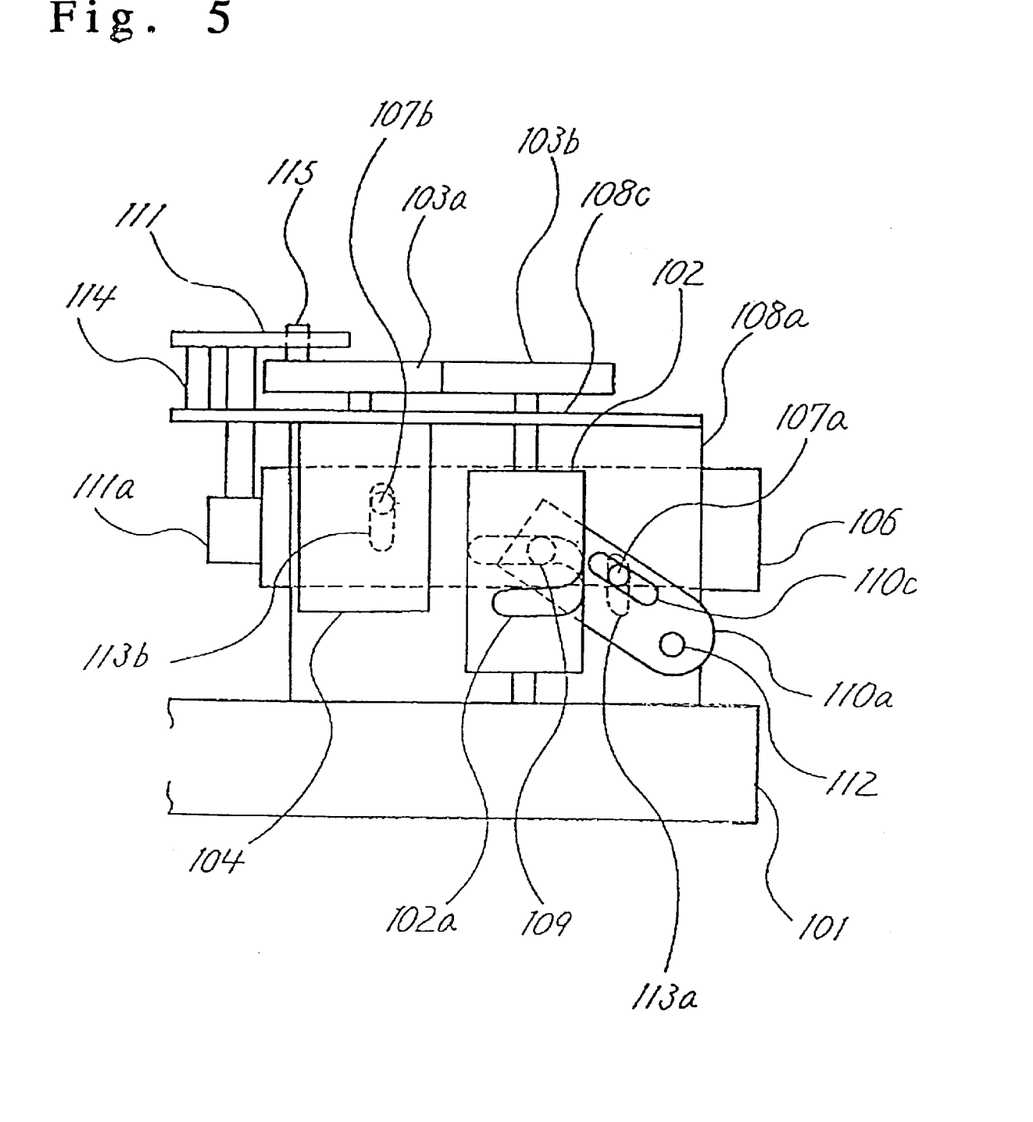
FIG. 5 is a side view of FIG. 4.

FIG. 4 and FIG. 5 are a plan view and a side view of an embodiment of the present invention, respectively.

On both sides of the position of base plate 101 where cartridge tray 106 is disposed, guide plates 108*a*, 108*b* are fixedly provided, and between lateral plate 108*c* which is formed by bending the top portion of guide plate 108*a* in a right angle (not shown in FIG. 4) and base plate 101, load cam 102 is provided in a rotatable manner being fixed to guide plate 108*a* and base plate 101 at both ends of its vertical axis, respectively. Being vertically suspended from lateral plate 108*c*, load motor 104 rotates load cam 102 through load gears 103*a*, 103*b*.

Guide rollers 107*a*, 107*b* provided on the side of cartridge tray 106 are fitted in guide grooves 113*a*, 113*b* of a longitudinal configuration provided in guide plate 108*a* in such a manner that guide roller 107*a*, 107*b* are movable only in the vertical direction, and guide roller 107*c* provided on the opposite side of cartridge tray 106 is fitted in a guide groove (not shown in the drawing) with a longitudinal configuration provided in guide plate 108*b* in such a manner that the roller is movable only in the vertical direction, and consequently cartridge tray 106 is guided so that it can move upward and downward.

Cartridge tray 106 is structured to a box shape with the front made completely open (however, a closing door may be provided), having the surface of both sides and the rear, bottom and top surfaces of a size allowing cartridge 105 to be set inside thereof and having openings provided in the rear surface and the rear portion of the top surface for pushing the rear surface of set cartridge 105 out, an opening provided in the rear side corner for taking out a magnetic tape from cartridge 105 and an opening made in the bottom for exposing a face gear (not shown) provided in a tape reel of cartridge 105 to be set inside.

Figure 6:
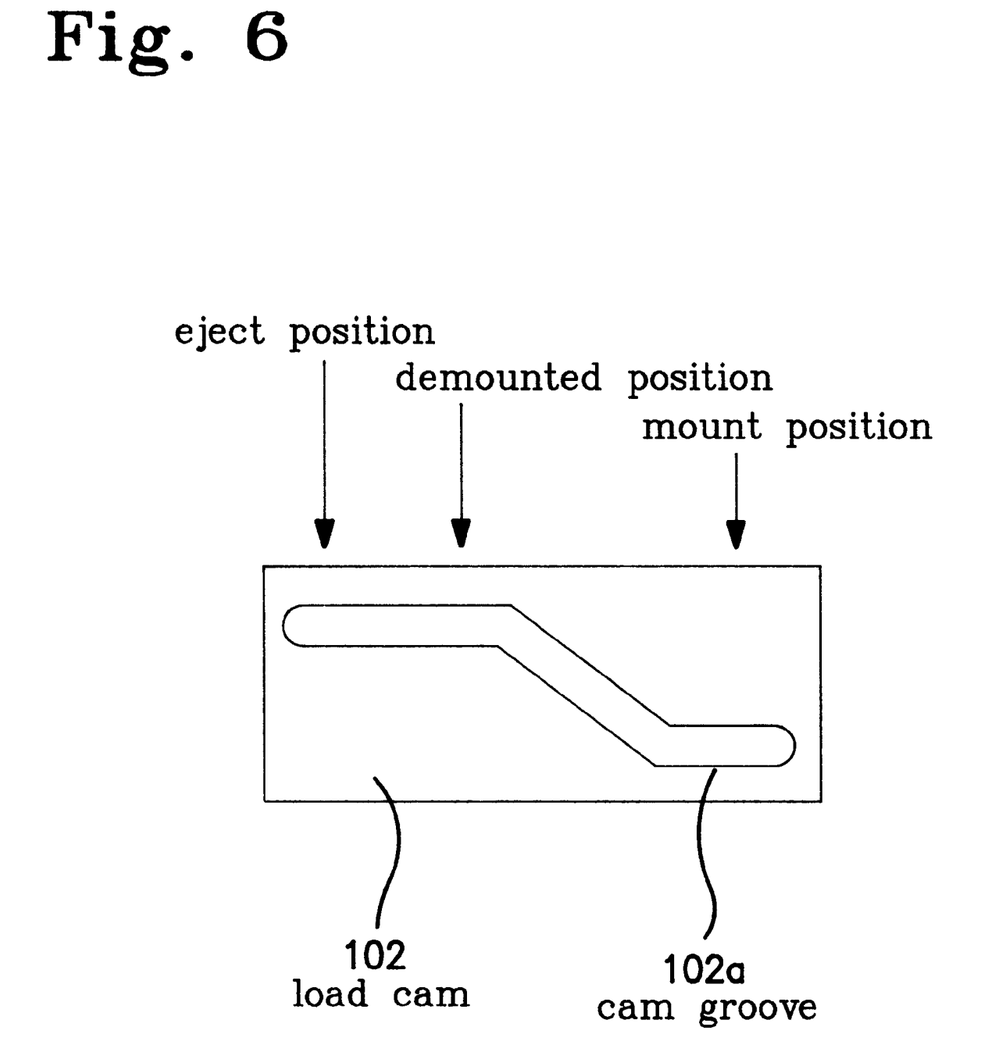
FIG. 6 is a development view of an outer side of load cam 102.

Driving arm 110*a* is fixed to the outside end part of guide plate 108*a* of timing shaft 112 attached to guide plates 108*a* and 108*b*. Cam follower 109 attached to driving arm 110*a* is fitted in cam groove 102*a* provided in the outer circumference of cylindrical load cam 102. As shown in FIG. 6 which illustrates a flat projection of the outer circumference of cylindrical load cam 102, cam groove 102*a* has a high horizontal part at one end thereof (ejection position, demounted position), a horizontal lowered position at the other end thereof (mounted position) and an inclined portion connecting therebetween. Accompanying the rotary oscillation of load cam 102, driving arm 110*a* oscillates vertically centering timing shaft 112.

Guide roller 107*a* is fitted in guide groove 113*a* and concurrently fitted in driving groove 110*c* of an oblique long hole provided in driving arm 110*a*, accordingly guide roller 107*a* moves up and down according to oscillation of driving arm 110*a*. At the end part of timing shaft 112 opposite to the end part thereof on which driving arm 110*a* is fixed, driving arm 110*b* is fixed to timing shaft 112 at the outside of guide plate 108*b*, and guide roller 107*c* is also fitted in another driving groove (not shown) of the same shape and direction as that of driving groove 110*c* provided in driving arm 110*b*. Therefore, accompanying the rotation of load cam 102, driving arm 110a, 110b also oscillate vertically causing cartridge tray 106 to move upward and downward. It is to be noted that the difference between the height of guide grooves 113a and 113b and the difference between the height of guide rollers 107a and 107b respectively are intentional to prevent cartridge tray 106 from being inclined from the play between dimensions of guide grooves 113a, 113b and guide rollers 107a, 107b.

L-formed ejection arm 111 is set pivotally on vertical shaft 114 provided on lateral plate 108c, load gear pin 115 provided on the upper surface of load gear 103a contacts edge portion 111b of ejection arm 111 corresponding to the rotation of load gear 103a thereby making ejection arm 111 rotate clockwise in FIG. 4. Cartridge push roller 111a downwardly provided at the tip of ejection arm 111 is disposed so as to face the rear of cartridge 105 set in cartridge tray 106 through an opening provided in the rear of cartridge tray 106.

Next, the operation of the present embodiment will be described.

In a demounted state (waiting state) when cartridge 105 is not yet set in cartridge tray 106, load cam 102 is stopped for placing cam follower 109 on the demounted position (FIG. 6) of cam groove 102a.

At this demounted state, edge portion 111b contacts with load gear pin 115, and the ejection arm 111 comes to the angle of swing position where cartridge push roller 111a takes the position adjacent at the back surface of cartridge 105 with a slight clearance, if the cartridge 105 is set in the cartridge tray 106. In this demounted state, cartridge 105 is inserted from the front and set in cartridge tray 106, and then load motor 104 is driven to rotate load cam 102 through load gears 103a, 103b to bring cam follower 9 to a mounted position (FIG. 6) of cam groove 102a. With this process, cam follower 9 descends, driving arm 110a and driven arm 110b move downwards, guide roller 107a goes down along guide groove 113a, and cartridge tray 106 as well as cartridge 105 set therein also descend. After finishing this descending process, a face gear provided at the lower end of a tape reel of cartridge 105 (related parts are not shown) engages with a gear provided on the upper surface of base plate 101 through an opening made in the bottom of cartridge tray 106, thus generating a mounted state.

In this mounted state, load gear 103a rotates in the direction in which load gear pin 115 separates from edge portion 111b of ejection arm 111 (clockwise rotation from the state of FIG. 4), and accordingly ejection arm 111 becomes rotatable without being restrained by load gear pin 115. However, rotation of ejection arm 111 is actually limited within a certain range so that ejection arm 111 will not interfere with apparatus and structures (not shown) in the surroundings and the rear of cartridge 105.

In this mounted state, a magnetic tape is drawn out from cartridge 105 to be wound by a winding reel of a not shown magnetic tape device to write/read data on the magnetic tape. Since this operation can be performed with the conventional technique, detailed description will be omitted.

When cartridge 105 is discharged after finishing write/read of the magnetic tape, load motor 104 is driven to rotate load cam 102 reversely against the direction for moving from the demounted state to the mounted state, thereby causing cam follower 109 to reach the ejection position (FIG. 6) passing from the mounted position through the demounted position of cam groove 102a. Cam follower 109 ascends until it reaches the demounted position, driving arms 110a, 110b also oscillate upwardly, cartridge tray 106 with cartridge 105 ascend, and accordingly the engagement between the face gear of the tape reel of cartridge 105 and the gear of base plate 101 is released. Until cam follower 109 comes to the demounted position, load gear pin 115 and edge portion 111b do not contact with each other, accordingly ejection arm 111 does not rotate.

When cam follower 109 moves from the demounted position further to the ejection position, since cam groove 102a is horizontal in this route, cartridge tray 106 keeps a raised state without fluctuating vertically. Then, by the rotation of load gear 103a (counterclockwise from the state of FIG. 4), load gear pin 115 pushes edge portion 111b to retreat causing ejection arm 111 to rotate clockwise in FIG. 4. Accordingly, cartridge push roller 111a pushes the rear of cartridge 105 to thrust cartridge 105 out of the cartridge tray 106 through the front by a fixed length, thus making it possible to hold the thrust part by such as an industrial robot and take out cartridge 105 from cartridge tray 106.

After then, load motor 104 is driven to rotate load cam 102 (in the same direction for moving from the demounted state to the mounted state) to make it return to the demounted state. In other words, make it return to the state in which cam follower 109 is on the demounted position of cam groove 102a, load gear pin 115 contacts edge portion 111b, and ejection arm 111 is rotated so that cartridge push roller 111a is almost adjacent to the rear of cartridge 105 which was set in cartridge tray 106.

Although it is not illustrated, by providing a sensor for detecting the rotation position of load cam 102 when cam follower 109 is on the ejection point, the demounted point, and the mounted point of cam groove 102a, respectively, and by further controlling the rotating direction and stoppage of load motor 104 corresponding to signals of the sensor, it becomes possible to control cartridge tray 106 to move appropriately upwards and downwards or stop.

The present invention is not limited to a device in which upward and downward movement of cartridge tray 106 is guided by guide rollers 107a to 107c and guide grooves 113a to 113c, but, for example, it is acceptable to use a device of another type such that a bearing attached to cartridge tray 106 is moved slidably along the vertical guide shaft. In this case, it is not necessary to provide driving arm 110b other than driving arm 110a, and by fitting guide roller 107a provided on cartridge tray 106 directly in cam groove 102a, then, both driving arms 110a, 110b become unnecessary.

Further in the above description, cam groove 102a shown in FIG. 6 has an ejection position and a mounted position disposed on both ends and load cam 102 is rotated to a normal/reverse direction to get each position, however, by arranging cam groove 102a to a circular endless type such that ejection position→demounted position→mounted position→demounted position→return to the initial ejection position, it becomes possible to cover all positions by rotating load cam 102 in one direction.

Cam follower 109, guide rollers 107a to 107c, and cartridge push roller 111a can be made in the form of a roller which is rotatable, but a mere pin formed one which does not rotate may also be used.

Each load gear 103a, 103b is not limited to a gear, but for example, a pulley may be applied to transmit rotation by a belt.

Movement direction of a cartridge tray is not limited to a vertical direction, but for example, a cartridge can be placed vertically and the cartridge tray moved horizontally to take out and put in the cartridge from the upper surface of the cartridge tray.

Further, the object of the present invention is not limited to a cartridge of a magnetic tape, but for example, a cartridge that houses a microfilm tape can be selected.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. In a tape cartridge setting mechanism having a cartridge tray with an opening aligned in a first direction for receiving a tape cartridge in which said cartridge tray is movable in a second direction perpendicular to the first direction, a first guide roller extending from a side of said cartridge tray for guiding movement of said cartridge tray, a guide portion adjacent said side of said cartridge tray and having a first slot therein with a longitudinal axis parallel to the second direction in which said first guide roller travels, a rotatable load cam with a cam groove in a circumference thereof, a pivoted driving arm with a cam follower extending therefrom into said cam groove and with a driving groove in which said first guide roller also travels, and a cartridge ejection arm for ejecting a tape cartridge from the cartridge tray in the first direction, wherein rotation of said load cam moves said cam follower causing movement of said driving arm causing movement of said first guide roller in said first slot and movement of said cartridge tray, the improvement comprising:

said guide portion having a second oblong slot that is spaced apart from said first slot in both the first and second directions and has a longitudinal axis parallel to the second direction, wherein the longitudinal axes of said first and second slots are spaced apart in the first direction more than a width of said slots and wherein ends of said slots nearest each other are spaced apart in the second direction on opposite sides of a line parallel to the first direction; and said cartridge tray having a second guide roller extending from said side thereof that is spaced apart from said first guide roller in both the first and second directions in a position corresponding to said second slot, said second guide roller engaging said second oblong slot and limiting movement of said cartridge tray only in the second direction.

2. The improvement of claim 1, wherein centers of said first and second guide rollers are spaced apart in the second direction less than a dimension of said side of said cartridge tray in the second direction.

* * * * *